United States Patent [19]

Davis et al.

[11] Patent Number: 5,567,994
[45] Date of Patent: Oct. 22, 1996

[54] ACTIVE HARMONIC FILTER WITH TIME DOMAIN ANALYSIS

[75] Inventors: Gerald W. Davis, Franklin, Wis.; Shiping Huang, Swansea, United Kingdom; Peter J. Unsworth, Brighton, England

[73] Assignee: Allen-Bradley Company, Inc., Milwaukee, Wis.

[21] Appl. No.: 536,894

[22] Filed: Sep. 29, 1995

[51] Int. Cl.$^6$ .................................. H02M 1/12
[52] U.S. Cl. .......................... 307/105; 363/39; 363/40; 363/41; 331/76
[58] Field of Search .................. 307/105, 106; 333/167; 363/39, 40, 41; 318/629; 327/532, 552; 331/76; 324/623; 455/114; 364/492

[56] References Cited

U.S. PATENT DOCUMENTS

| | | | |
|---|---|---|---|
| 3,883,792 | 5/1975 | Ellert | 363/39 |
| 4,862,342 | 8/1989 | Dhyanchand et al. | 363/40 |
| 5,001,619 | 3/1991 | Nakajima | 363/41 |
| 5,063,532 | 11/1991 | Takeda | 363/41 |
| 5,224,028 | 6/1993 | Lipman | 363/41 |
| 5,327,335 | 7/1994 | Maddali et al. | 363/39 |
| 5,377,092 | 12/1994 | Rowand | 363/41 |
| 5,397,927 | 3/1995 | Suelzle | 307/105 |
| 5,508,623 | 4/1996 | Heydt | 307/105 |
| 5,513,090 | 4/1996 | Bhattacharya | 307/105 |

Primary Examiner—William M. Shoop, Jr.
Assistant Examiner—Peter Ganjoo
Attorney, Agent, or Firm—Patrick S. Yoder; John M. Miller; John J. Horn

[57] ABSTRACT

A hybrid active filter shunts three-phase power with passive elements tuned to have low impedance at a frequency of harmonic distortion. The passive elements are in series with controlled voltages sources providing cancelling currents to the harmonic currents. Rapid determination of the harmonic currents is provided in real-time through the use of a Park transformation reducing the variables which need to be manipulated. Measured currents as transformed are used to model undistorted current based on an average power consumed by the load. When the undistorted current is subtracted from the actual current, a harmonic current signal is produced that may be used to drive the voltage sources. The time domain method requires rapidly computed running averages and thus may be performed in-between the acquisition of the measured current samples.

11 Claims, 3 Drawing Sheets

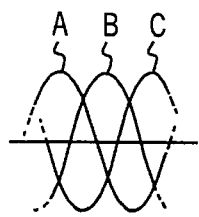
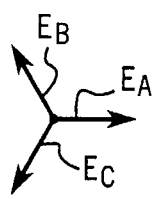
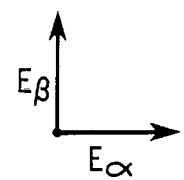
FIG. 3(a)  FIG. 3(b)  FIG. 3(c)
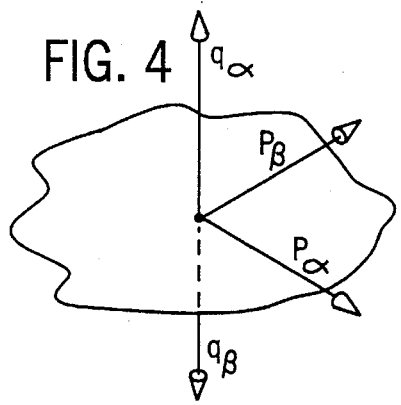
FIG. 4
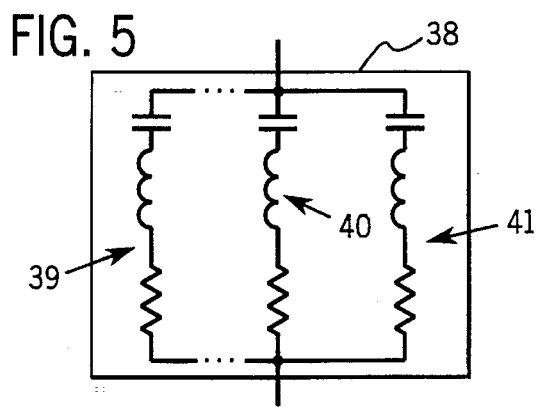
FIG. 5
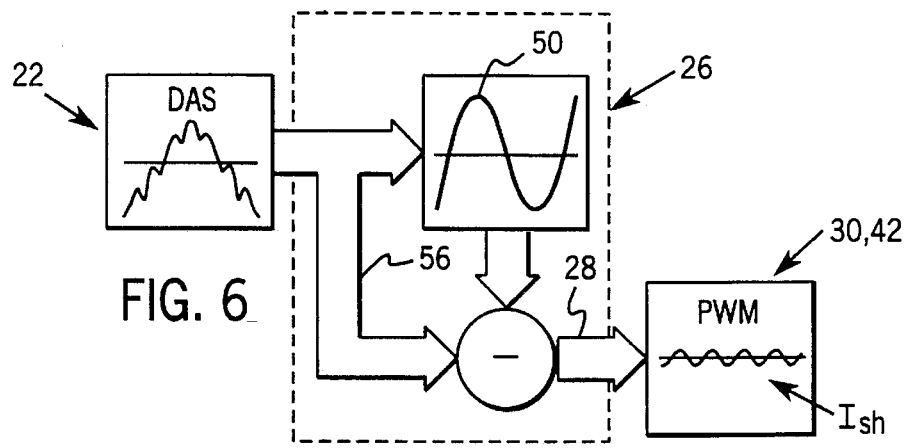
FIG. 6
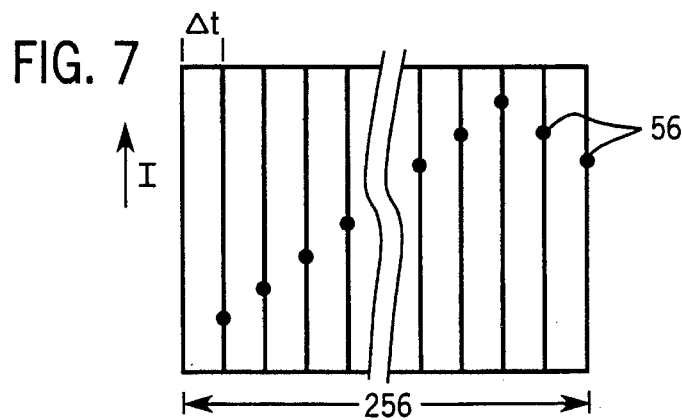
FIG. 7

ACTIVE HARMONIC FILTER WITH TIME DOMAIN ANALYSIS

FIELD OF THE INVENTION

The present invention concerns electrical filters for eliminating transients and distortion in alternating current (AC) power mains, and in particular, to active filters for such use.

BACKGROUND ART

Ideally, three-phase AC power, as is used in most industrial environments, employs three conductors of electrical power each providing a pure sine wave of current and voltage, the sine waves having equal and constant amplitude and frequency, and each separated from the others by 120° of phase angle.

With the increased use of the solid-state power electronic devices, having non-linear load characteristics, such as motor controllers having switched triacs which connect and disconnect large loads rapidly, the three-phase power at a given facility may become distorted. Such distortion is characterized by the introduction of harmonics into the fundamental frequency of the AC power. Harmonics cause loss of energy in motors and may effect the efficiency and stability of power supplies for sensitive electronic equipment. For this reason limitations on harmonic levels in AC power have been established in many countries.

The harmonic distortion in an AC power main may be reduced by the use of passive filters incorporating inductors and capacitors that have a series resonance at the harmonic frequencies. These passive filters are placed across the power mains to shunt the damaging harmonics.

Such passive filters have a simple structure but a number of disadvantages: they are bulky and expensive, they do not adapt to changes in harmonic frequencies caused by shifts in the fundamental AC frequency, and they do not account for variations in the series impedance of the power mains.

These disadvantages may be overcome by the use of active filters in which a power amplifier (such as a pulse width modulated (PWM) power supply) is connected directly to the power main to provide a countervailing harmonic current cancelling the distortion. Such active filters may be used with passive filters in a hybrid arrangement in which the PWM power supply is connected to the power mains through a series resonant circuit to block the AC fundamental and hence to decrease loading on the PWM power supply.

In order to cancel the harmonic currents, the currents provided by the active or hybrid filter must be equal and opposite to the undesired harmonic currents. Accordingly, both the phase and amplitude of the harmonic component of the power main must be accurately known. There are a number of methods of extracting harmonic components from a waveform including the use of analog filter circuits and digital signal processing. Analog filters have the disadvantages of being extremely sensitive to the values of their components and thus being subject to drift in filter frequency and degradation in performance. Frequency domain digital signal analysis techniques, such as the Fast Fourier Transform, can be extremely stable but are not presently fast enough to provide accurate real time control necessary for the suppression of harmonics with the current generation of industrial computers.

SUMMARY OF THE INVENTION

The present invention provides a hybrid filter for AC power mains that may rapidly and accurately determine harmonic components in real-time so as to produce a canceling harmonic current. Generally the filter analyzes the waveform of the power mains in the time-domain to compute the average power being delivered to the load. An "ideal" sine wave current producing an identical power is then synthesized in phase with the power main current and deviations from this ideal are assumed to be harmonics. These harmonics are used to drive a compensating power source which is connected to the power mains through a passive network.

Specifically, the hybrid filter includes a current transducer connected to at least one line of the power main providing a current signal indicating the actual current waveform in the line. An electronic computer operating according to a stored program and receiving the current signal determines a harmonic-less current waveform matching the power characteristics of the actual current waveform. A controllable voltage source, producing a voltage proportional to the difference between the harmonic-less current waveform and the actual current waveform, is connected to one end of a passive resonant circuit having an impedance minimum at a frequency near the harmonic frequency component. The remaining end of the passive resonant circuit is attached at a second end to the power line.

Accordingly, it is one object of the invention to provide a computer-controlled hybrid filter determining the necessary canceling currents on a real-time basis. Comparison of the current of the AC power main to a comparable "perfect" current signal provides near instantaneous detection of harmonics with a simple subtraction operation.

The electronic computer may compute the harmonic-less current waveform by determining an average load on the main and setting the harmonic-less current waveform equal to the current through the average load in the presence of a sine wave voltage of predetermined amplitude equal in frequency to the fundamental frequency component of the actual current waveform.

Thus, it is another object of the invention to provide a simple method of estimating a fundamental frequency sine wave current equivalent to that provided by the distorted waveform of the AC power main. Computation of the average power of the load may be determined at high speed on a real-time basis as each new sample of the AC power main current is received.

The current signal may be a series of discrete samples and the average load may be determined on a sample-by-sample basis by adding a new sample to a running total for one cycle of the fundamental frequency of the AC main, subtracting the oldest sample from the total and dividing the resulting total by the number of samples. The number of samples in the total may be an integer multiple of two so that the division of the total may be done by shifting a binary version of the total left by the integer number of places.

Thus, it is yet another object of the invention to provide a rapid method of performing the computations required of the present invention on a conventional digital electronic computer.

The foregoing in other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIGS. 3(a) through (c) are three representations of the same three-phase current: platted as a graph against time, represented as three vectors in a rotating coordinate system, and represented as two perpendicular vectors after a Park transformation;

FIG. 4 is a three dimensional vector representation of four power quantities calculated from the Park transformation of the three phase current per FIG. 3(c);

FIG. 5 is a detailed schematic representation of one passive band pass filter of FIG. 1;

FIG. 6 is a block diagram showing the general procedure of the present invention for receiving a harmonically distorted AC waveform and determining the harmonic components of that waveform in the time-domain;

FIG. 7 is a plot of current samples acquired by the digital acquisition system of FIG. 1 plotted against time showing the sampling rate of the digital acquisition system;

DETAILED DESCRIPTION OF THE PREFERRED EMBODIMENT

Figure 1:
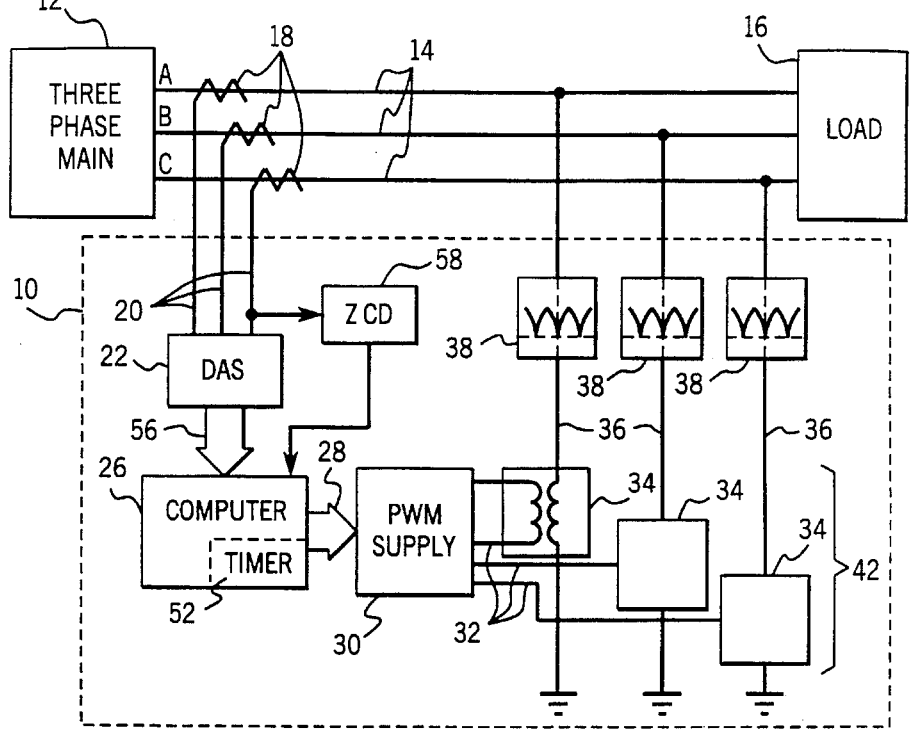
FIG. 1 is a block diagram of a hybrid active filter per the present invention connected to a three-phase AC main showing a computer, a data acquisition system for acquiring current information for the three-phases for the computer, and a pulse width modulated supply controlled by the computer and connected to the phases through passive band-pass filters to provide compensating current to the three-phases.

Referring now to FIG. 1, the hybrid active filter 10 of the present invention is used in conjunction with a three-phase AC main 12 having three conductors 14 carrying sinusoidal currents and voltages in approximately 120° phase relationship to each other. A load 16, such as may include high current switching devices, such as triacs, receives power from the three conductors 14.

The three-phase main 12 has a source impedance that is largely inductive but that may vary for different locations and at different times. The electrical power consumed by the load 16 changes over time, and in particular, may vary substantially within a single cycle of the AC current of the three-phase main 12. The varying load acting against the source impedance of the main 12 introduces harmonic distortion to the AC waveforms on the conductors 14.

OVERVIEW OF THE ACTIVE FILTER HARDWARE

The hybrid active filter 10 receives three independent current signals 20 proportional to the amount of current flowing through the conductors 14 at any instant by means of three current transducers 18 communicating with the conductors 14 but electrically insulated therefrom. The current transducers 18 may be Hall-effect devices such as are well known in the art.

Generally, the current signals 20 are received by a data acquisition system (DAS) 22 which samples the current signals 20 at discreet intervals in time and digitizes those sample values into digitized data points 56 which may be communicated to a computer 26 for processing. The binary words are then processed by computer 26 to control a pulse width modulated (PWM) power supply 30. The computer 26 provides digital words 28 to the PWM power supply 30 indicating a desired output currents to be conducted through conductors 32 to the primary windings of transformers 34. The currents in conductors 32 induce through the transformers 34 three corrective voltages 36, one associated with each conductor 14 at the secondary windings of the transformers 34. The secondary windings of the transformers 34 are connected at one side to a common neutral and the other side through passive filters 38 to the conductors 14.

Thus, generally, based on the information about current flow received by the hybrid active filter 10 through the current transducers 18, corrective currents are caused to flow through the passive filters 38 to reduce the harmonic distortion of the three-phase main 12 as is present on the conductors 14.

Zero Crossing Detector

The current signals 20 are also received by a zero crossing detector 58 which, as is understood in the art, may be simply a comparator comparing the value of the current signal 20 to zero to produce a signal when the current signal 20 passes through zero. The zero crossing detector 58 is attached to an interrupt input of the computer 26 causing a shift in the program processed by the computer, as will be described further below.

Passive Filters

Referring now to FIG. 5, each passive filter 38 is composed of two or more series resonant circuits 40 and a high pass circuit 41 all connected in parallel. Each series resonant circuit 40 is tuned to a different harmonic frequency of a standard 60 hertz AC power main to have a low impedance only at that harmonic. In a preferred embodiment, the series resonant circuits 40 are tuned to the fifth and seventh harmonics respectively. As indicated by the dotted lines, additional series resonant circuits 40 may be added, if desired, to cover additional harmonics. The high pass circuit 41 is tuned to have a frequency breakpoint to provide passage of both the eleventh and thirteenth harmonics of a 60 hertz fundamental.

The series resonant circuits are composed each of a series connected capacitor and inductor to provide a band pass filter, where a small series resistor in such circuits controls the width of the pass band or Q of the resonance as is understood in the art. The high pass circuit 41 is a series capacitor and resistor.

GENERAL OPERATION OF THE HYBRID FILTER

Figure 2:
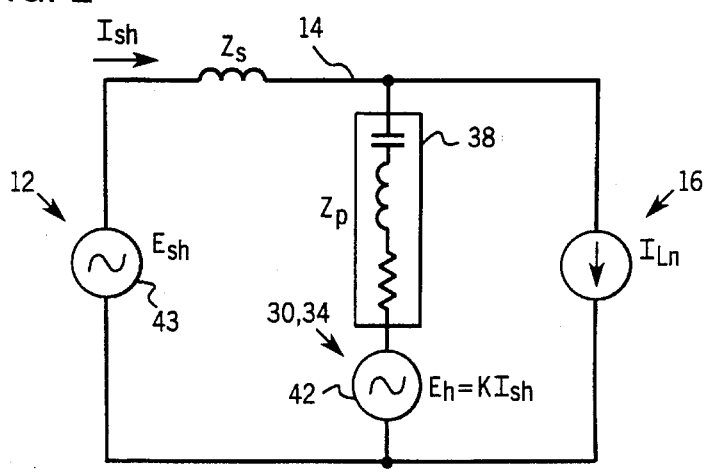
FIG. 2 is a schematic representation of an equivalent circuit to the filter and AC main of FIG. 1 for one phase and one harmonic frequency.

Referring now to FIGS. 1 and 2, a single phase of the AC power main 12 for a single harmonic frequency may be modeled as a AC voltage source 43 producing a sine wave voltage at the harmonic frequency $E_{sh}$ in series with a source impedance $Z_s$. When connected to a load 16, drawing a current $I_{ln}$, a harmonic circuit $I_{sh}$ flows from the main 12.

For a single phase (one conductor 14) a single passive filter 38 will be connected shunting the load 16. The passive filter provides an impedance $Z_p$ in series with a variable voltage source 42, the latter realized by the PWM power supply 30 and transformer 34. The purpose of the voltage source 42 is to augment the action of the passive filter and to cancel the harmonic currents $I_{sh}$. Therefore the voltage $E_h$ of the voltage source 42 will ideally equal a constant K times the harmonic current $I_{sh}$.

Applying well known circuit analysis laws to the schematic FIG. 12 provides the following relationship controlling the harmonic current.

$$I_{sh} = \frac{Z_p}{Z_s + Z_p + K} I_{lh} + \frac{1}{Z_s + Z_p + K} E_{sh} \tag{1}$$

As will be apparent from equation 1, when K is much greater than $Z_p$, $Z_s$ then the harmonic current $I_{sh}$ will approach zero.

Operating Software

Referring now to FIGS. 2 and 6, it will be understood that in order to generate the voltage $E_h$ with the voltage source 42, it will be necessary to know accurately the harmonic circuit $I_{sh}$. Further, $I_{sh}$ must be known in a near instantaneous manner so that a real-time correction current $-I_{sh}$ may be generated through the passive filter 38.

This rapid determination of the harmonic components $I_{sh}$ is performed by processing with the computer 26 the current signals 20 for each conductor 14 to extract an pure sine wave current 50 that would deliver an equivalent average power to load 16. This sine wave current 50 is then subtracted from the actual current signals 20 to produce the harmonic current $I_{sh}$. Note that the harmonic current $I_{sh}$ will in fact be a sum of all harmonic currents. Thus, as a first step of the processing by computer 26 the sine wave current 50 must be computed from the current signals 20 received by the digital acquisition system 22.

Referring now to FIGS. 1 and 7 this first step requires that data points 56 be collected at regular intervals of time $\Delta t$ from the current transducers 18 by the digital acquisition system 22. The timing of the acquisition of these data points 56 is controlled by an internal timer 52 within the computer 26 which signals the digital acquisition system 22 to acquire each data point 56 of the current signals 20 and to convert that sample into a data point 56. The timer 52 is programmable so that the time value $\Delta t$ may be changed by the computer running its operating program as will be described.

The values of the data points 56 are stored in computer memory (not shown) within computer 26 in a "rolling" buffer, i.e., the most recently sampled data point 56 is inserted at the front of the buffer and the oldest data points 56 is removed from the back of the buffer so that always the most recent 256 data points are present in the buffer in numeric order from front to back.

Figure 8:
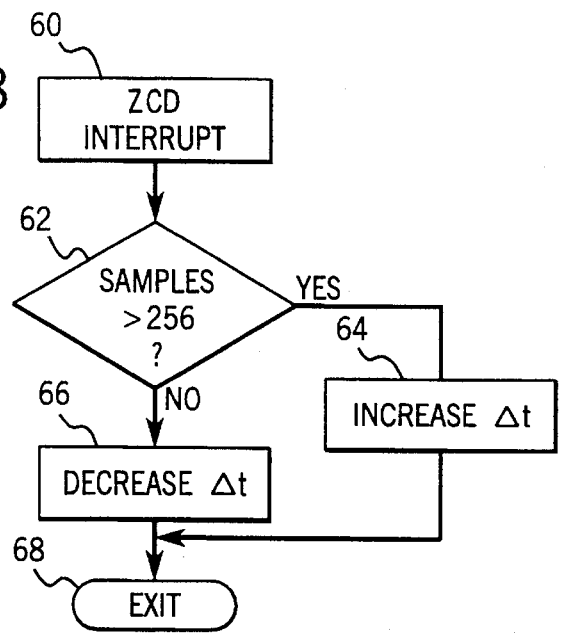
FIG. 8 is a flow chart showing an interrupt routine performed by the computer of FIG. 1 for adjusting the sampling rate of the digital acquisition system of FIG. 1.

Referring now to FIG. 8, at process block 60 representing a first program step in an interrupt routine operating on computer 26, a zero crossing of one current signal 20 is detected by a zero crossing detector 58, which causes the computer 26 to suspend its main program (to be described below) and to begin executing this interrupt routine of FIG. 8. At decision block 62, the number of data points 56 acquired since the last interrupt is examined. If the number of samples is greater than 256, then at process block 64, the computer reprograms the timer 52 to increase the $\Delta t$ value.

Conversely, if the number of samples is less than 256, then at process block 66, the computer 26 reprograms timer 52 to decrease the $\Delta t$ value. In either case, at the next step, the interrupt routine is concluded at exit block 66 and the computer 26 returns to its normal processing.

It will be understood that the effect of the interrupt routine of FIG. 8 will be to adjust the value of $\Delta t$ so that 256 samples are obtained during a typical cycle of the three-phase main 12. For a 60 hertz signal, therefore $\Delta t$ will be approximately 25 microseconds. As will be described further below, by ensuring that there are 256 samples in each cycle of the fundamental frequency of the power on the main 12, the speed with which the necessary calculations, to be described below, can be performed, is increased significantly.

When the computer 26 is not executing the interrupt routine of FIG. 8, or the interrupt driven sampling of the current signals 20, the computer 26 executes a main program which calculates the harmonics on the AC main 12.

Figure 9:
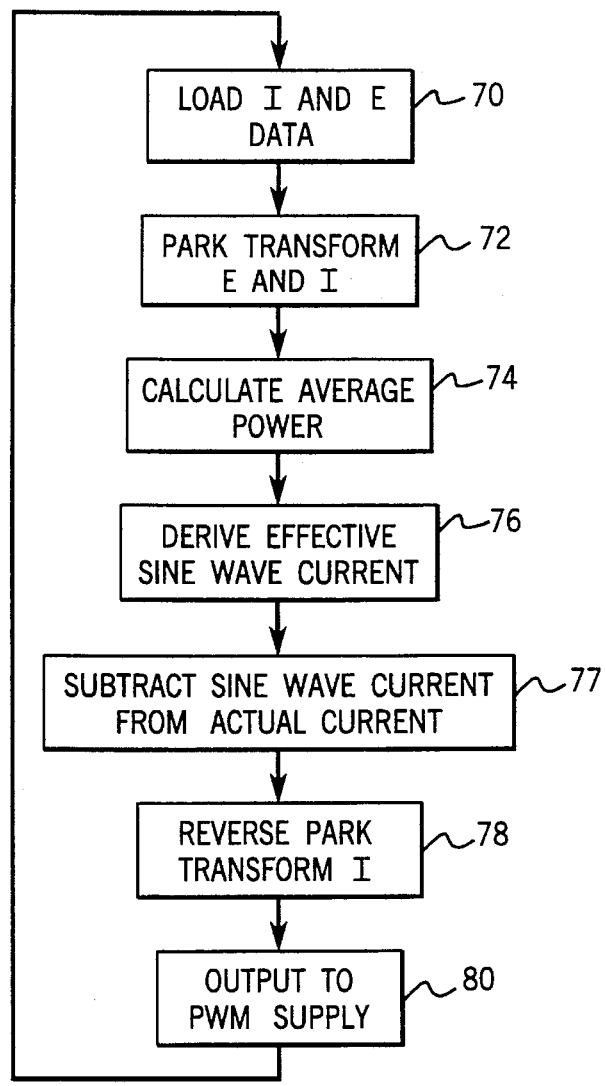
FIG. 9 is a flow chart of a program executed on the computer of FIG. 1 for performing the steps of FIG. 6.

Referring to FIGS. 1 and 9, at process block 70 the latest next current data points 56 (shown in FIG. 7 and designated I) is received by the computer 26. A voltage signal E is also received by the computer 26 but from an internal lookup table of a sine values stored in memory. The sine values are of arbitrary phase and amplitude with respect to the current signals 20 and hence data point 56 but have the same frequency as the current signals 20 of the three-phase main 12. This matching of frequencies is ensured by having the lookup table include 256 entries for 360° of a sine function. Because the number of data points of the current signal 20 is constantly adjusted by the interrupt program of FIG. 8 to be exactly 256 samples, frequency equivalence between the I and E data is naturally obtained.

At the conclusion of process block 70, six samples are obtained, three values of current I and three values of voltage E.

Referring now to FIG. 3(a), each of three phases of a typical three-phase main labelled A, B, and C are shown plotted against time. As can be seen, the phase difference between the phases A, B, and C is approximately one-third of a cycle or 120°. As shown in FIG. 3(b), these phases may be represented by a vector diagram showing three vectors $E_A$, EB, and $E_C$ extending at 120° separations from a common vertex. In this representation, the length of the vector represents the amplitude of the phase and the angle of the vector with respect to other vectors represents the phase difference between the phases. Generally, if the vector diagram of FIG. 3 were rotated about the vertex, the projection of each vector or dot product of the vector with an axis, would produce the waveforms of the FIG. 3(a). A similar set of waveforms and vector diagrams can be generated for the current on a three-phase main 12.

The representation of FIG. 3(b) includes redundant information and may be reduced to a two vector representation of FIG. 3(c) without loss of information by a Park transform provided generally in matrix equation (2) for voltage and (3) for currents below:

$$\begin{bmatrix} e_\alpha(t) \\ e_\beta(t) \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} e_a(t) \\ e_b(t) \\ e_c(t) \end{bmatrix} \tag{2}$$

-continued $$\begin{bmatrix} i_\alpha(t) \\ i_\beta(t) \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a(t) \\ i_b(t) \\ i_c(t) \end{bmatrix} \quad (3)$$

In equations (2) and (3), the multiplication implicit in the matrix is one of a vector times a scalar and the addition follows normal vector addition rules. The Park transformation of equations (2) and (3) is done on a sample-by-sample basis as indicated by process block 72 and reduces the number of calculations to be performed later.

At process block 74, four different instantaneous power quantities are determined: real powers represented by equations 4 and 5 and "imaginary" powers given by equations (6) and (7).

$$p_\alpha(t) = e_\alpha(t) \cdot i_\alpha(t) \quad (4)$$

$$p_\beta(t) = e_\beta(t) \cdot i_\beta(t) \quad (5)$$

$$q_\alpha(t) = -e_\beta(t) \times i_\alpha(t) \quad (6)$$

$$q_\beta(t) = e_\alpha(t) \times i_\beta(t) \quad (7)$$

The imaginary powers are cross products of the two vector quantities shown and generally reflect reactive components in the load 16. A vector representation of these different powers is shown in FIG. 4 in which the reactive powers $q_\alpha$ and $q_\beta$ are perpendicular to the plane of $p_\alpha$ and $p_\beta$ according to the right-hand rule and the convention for cross products.

Next, still at process block 74, average values of real and imaginary power are computed as indicated by equations (8) through (11) where T is one cycle of the waveforms of the main 12.

$$P_\alpha = \frac{1}{T} \int_0^T p_\alpha(t) dt \quad (8)$$

$$P_\beta = \frac{1}{T} \int_0^T p_\alpha(t) dt \quad (9)$$

$$Q_\alpha = \frac{1}{T} \int_0^T q_\alpha(t) dt \quad (10)$$

$$Q_\beta = \frac{1}{T} \int_0^T q_\beta(t) dt \quad (11)$$

Computer 26 computes equations (8) through (11) by adding the new values of instantaneous real power and instantaneous imaginary power, computed from the latest values of I and E, to running totals for the last 256 such calculations while subtracting instantaneous real power and instantaneous imaginary power computed from the values of I and E taken 257 samples ago. This new total is then divided by 256.

Thus, the average power is recomputed at the acquisition of each new data point 56 but requires only three simple operations. A division by 256 may be performed rapidly on the computer 26 by simply a shifting of the binary number representing the totals leftward by eight places—a basic computer instruction. Thus, the calculations of (8) through (11) can be performed rapidly in between the acquisitions of samples.

In addition, mean values of the Park transform of the voltages in the lookup table in computer 26 is undertaken per equations 11 and 12 respectively using the same procedure described above of modifying a running total by the newest and oldest points and dividing by the total number of points 256 through a leftward shift.

$$V_\alpha^2 = \frac{1}{T} \int_0^T v_\alpha^2(t) dt \quad (12)$$

$$V_\beta^2 = \frac{1}{T} \int_0^T v_\beta^2(t) dt \quad (13)$$

As indicated by process block 76, an effective sine wave current is now deduced by computing an effective average value of the effective load 16 (assuming the voltage were constant) and based on the average powers and voltages previously determined in equations (8) through (13). This average load has a conductance and susceptance component, the conductance being computed according to equation (14) and (15) and the susceptance being determined according to equations (16) and (17).

$$G_\alpha = \frac{P_\alpha}{V_\alpha^2} \quad (14)$$

$$G_\beta = \frac{P_\beta}{V_\beta^2} \quad (15)$$

$$B_\alpha = \frac{Q_\alpha}{V_\beta^2} \quad (16)$$

$$B_\beta = \frac{Q_\beta}{V_\alpha^2} \quad (17)$$

From these determinations of an average load, values of an effective sine wave current (assuming constant AC voltage) are determined by equations (18) through (21).

$$i_{\alpha a} = G_\alpha \cdot v_\alpha(t) \quad (18)$$

$$i_{\beta a} = G_\beta \cdot v_\beta(t) \quad (19)$$

$$i_{\alpha r} = -B_\alpha \cdot v_\beta(t) \quad (20)$$

$$i_{\beta r} = -B_\beta \cdot v_\alpha(t) \quad (21)$$

Four such current values must be deduced because of the possibility of a reactive component in the load 16. The currents of equations (18) through (21) describe a current that would provide similar power to the load 16 as the load 16 is actually receiving but if the current were to be a pure sine wave.

This effective sine wave current is then subtracted from the actual measured current to produce the harmonic current as shown in FIG. 6 according to equations (22) and (23), and per process block 77.

$$i_{\alpha h} = i_\alpha(t) - i_{\alpha a}(t) - i_{\alpha r}(t) \quad (22)$$

$$i_{\beta h} = i_\beta(t) - i_{\beta a}(t) - i_{\beta r}(t) \quad (23)$$

As indicated by process block 78, this computed effective sine wave current is then reverse Park transformed to produce harmonic current values $I_{sh}$ for each of the three phases per equation (24):

$$\begin{bmatrix} i_{ah}(t) \\ i_{bh}(t) \\ i_{ch}(t) \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{\alpha h}(t) \\ i_{\beta h}(t) \end{bmatrix} \quad (24)$$

At process block 80, the harmonic currents for each of the phases is output to the PWM power supply 30 to provide the necessary harmonic currents $I_{sh}$ via the transformers 34.

A complete analysis of the equations above establishes that the amplitude and phase of the voltage values V obtained from the lookup table drops out of the resulting equation defining the harmonic currents. Thus, no actual voltage measurement need be made above the conductor 14 of the power main 12 reducing the hardware costs of the filter.

Many other modifications and variations of the preferred embodiment which will still be within the spirit and scope of the invention will be apparent to those with ordinary skill in the art. In order to apprise the public of the various embodiments that may fall within the scope of the invention, the following claims are made.

We claim:

1. A hybrid filter removing harmonic components from an AC power source, the AC power source providing an actual current waveform including a fundamental and harmonic frequency component flowing through a line connected to a load, the filter comprising:

a current transducer connected to the line to provide a current signal indicating the actual current waveform in the line;

an electronic computer operating according to a stored program and receiving the current signal to determine a harmonic-less current waveform matching the power characteristics of the actual current waveform;

a controllable voltage source producing a voltage proportional to the difference between the harmonic-less current waveform and the actual current waveform;

a passive resonant circuit attached at a first end to the line and having a impedance minima at a frequency near the harmonic frequency component and attached at a second end to the controllable voltage source.

2. The hybrid filter of claim 1, wherein the electronic computer operates according to the stored program, to compute the harmonic-less current waveform by determining an average load and setting the harmonic-less current waveform equal to the current through the average load in the presence of sine wave voltage equal in frequency to the fundamental frequency component of the actual current waveform.

3. The hybrid filter of claim 2 wherein the average load includes resistive and reactive components.

4. The hybrid filter of claim 1 wherein the line is one of three lines carrying three-phase power; and wherein the current transducer provides three current signals indicating the actual current waveforms in the three lines; and wherein the electronic computer operates according to the stored program and receiving the three current signals to first converts the three current signals into two orthogonal composite signals, and wherein the harmonic-less current waveform is determined from the two composite signals.

5. The hybrid filter of claim 2 wherein the current signal is a series of discrete samples and wherein the electronic computer determines the average load from a mean value of a plurality functions of consecutive discrete samples employing the steps of:

(i) dividing a function of a new sample by the number of the plurality of consecutive discrete samples;

(ii) adding the divided function of step (i) to the mean value;

(iii) dividing a function of an earlier sample by the number of the plurality of consecutive discrete samples; and (iv) subtracting the divided function of step (iii) from the mean value;

whereby a rolling mean is obtained as each new sample is obtained.

6. The hybrid filter of claim 2 where the plurality of samples is a $2^n$ where n is an integer.

7. The hybrid filter of claim 6, whereby the dividing of steps (i) and (iv), is performed by shifting left the binary representation of the function n places.

8. The hybrid filter of claim 2, wherein the amplitude and phase of the sine wave voltage are an arbitrary constant value not dependant on the actual voltage.

9. The hybrid filter of claim 8, wherein the value of the sine wave voltage is obtained from a stored look-up table in computer memory.

10. The hybrid filter of claim 1 wherein the current transducer acquires discrete samples at regular intervals based on a timer, and wherein the hybrid filter includes further an fundamental frequency detector for detecting the fundamental frequency of the actual current waveform and wherein the timer is adjusted based on the fundamental frequency detector so as to obtain the plurality of samples during a single cycle of the fundamental frequency.

11. The hybrid filter of claim 10 wherein the fundamental frequency detector is a zero crossing detector detecting times when the actual current waveform passes through zero.

* * * * *